(12) United States Patent
Saha et al.

(10) Patent No.: US 8,406,554 B1
(45) Date of Patent: Mar. 26, 2013

(54) IMAGE BINARIZATION BASED ON GREY MEMBERSHIP PARAMETERS OF PIXELS

(75) Inventors: Satadal Saha, Kolkata (IN); Subhadip Basu, Kolkata (IN); Mita Nasipuri, Kolkata (IN); Dipak Kumar Basu, Kolkata (IN)

(73) Assignee: Jadavpur University, Kolkata (IN)

( * ) Notice: Subject to any disclaimer, the term of this patent is extended or adjusted under 35 U.S.C. 154(b) by 601 days.

(21) Appl. No.: 12/629,187

(22) Filed: Dec. 2, 2009

(51) Int. Cl.
*G06K 9/38* (2006.01)
*G06K 9/36* (2006.01)

(52) U.S. Cl. ...................... 382/270; 382/237

(58) Field of Classification Search .............. 382/270
See application file for complete search history.

(56) References Cited

U.S. PATENT DOCUMENTS

| | | | |
|---|---|---|---|
| 5,201,012 A | | 4/1993 | Hisano et al. |
| 5,524,070 A | * | 6/1996 | Shin et al. .................. 382/274 |
| 6,351,566 B1 | * | 2/2002 | Zlotnick .................... 382/237 |
| 6,941,013 B1 | | 9/2005 | Drayer |
| 6,995,802 B2 | | 2/2006 | Sugimoto |
| 7,532,767 B2 | * | 5/2009 | Oztan et al. ................ 382/268 |
| 2002/0051209 A1 | * | 5/2002 | Yamada ..................... 358/2.1 |
| 2002/0131646 A1 | * | 9/2002 | Fujimoto et al. ........... 382/266 |
| 2009/0148042 A1 | * | 6/2009 | Fan et al. .................... 382/176 |
| 2009/0185236 A1 | * | 7/2009 | Zeng ......................... 358/450 |

OTHER PUBLICATIONS

Saha, S., et al., "A Novel Scheme for Binarization of Vehicle Images using Hierarchical Histogram Equalization Technique," pp. 1-5.
Ntirogiannis, K., et al., "A Modified Adaptive Logical Level Binarization Technique for Historical Document Images," 2009 10th International Conference on Document Analysis and Recognition, pp. 1171-1175.

* cited by examiner

*Primary Examiner* — David Zarka
(74) *Attorney, Agent, or Firm* — Brundidge & Stanger, P.C.

(57) ABSTRACT

Briefly, in accordance with one aspect, a method of binarizing an image is provided. The method includes partitioning the image into a plurality of image segments, each image segment having a plurality of image pixels and partitioning each of the image segments into subsegments, each image subsegment having a plurality of image pixels. The method also includes estimating a grey membership parameter for each image pixel for each of the plurality of image segments and subsegments, combining the grey membership parameter for each of the plurality of image pixels from each of the plurality of image segments and subsegments to estimate a net grey membership parameter for each image pixel and assigning black or white color to each of the plurality of image pixels based on the estimated net grey membership parameter of the respective pixel.

15 Claims, 5 Drawing Sheets

| Original Image | Ground Truth Image | Binarized Image | Binarization Results 570 |
|---|---|---|---|
| 510 | 530 | 550 | Image size: 2477 x 1078 pixels<br><br>tp=39634<br><br>fp=3130<br><br>fn=6607<br><br>rc=0.857118<br><br>pr=0.926808<br><br>fm=89.060165 |
| 520 | 540 | 560 | Image size: 201 x 824 pixels<br><br>tp=6367<br><br>fp=47<br><br>fn=3075<br><br>rc=0.674327<br><br>pr=0.992672<br><br>fm=80.310295 |

FIG. 5

IMAGE BINARIZATION BASED ON GREY MEMBERSHIP PARAMETERS OF PIXELS

BACKGROUND

Image binarization is a process of converting a grey scale image to a black and white image. A traditional way of image binarization involves selecting a global pixel threshold for an entire image and classifying all pixels above the threshold as white and all other pixels as black. However, use of a global threshold for binarization of an entire image may result in suppression of local variations within the image that may contribute towards the information content within the image.

Certain image binarization techniques determine a local threshold using a window or region around each pixel of the image. Further, depending on whether the threshold is to be used for the center pixel of the window or for all the pixels in the window, the image binarization may be performed on a pixel-by-pixel basis where each pixel may have a calculated threshold value, or on a region-by-region basis where all pixels in a region or window have same threshold value.

Typically, local thresholds are determined for specific areas of the images based upon certain assumptions such as size of objects in the image, noise levels and other image properties. However, it is difficult to accurately estimate local thresholds for different areas of the image. Furthermore, local thresholds may work well only for specific types of images for which they are designed.

SUMMARY

Briefly, in accordance with one aspect, a method of binarizing an image is provided. The method includes partitioning the image into a plurality of image segments, each image segment having a plurality of image pixels and partitioning each of the image segments into subsegments, each image subsegment having a plurality of image pixels. The method also includes estimating a grey membership parameter for each image pixel for each of the plurality of image segments and subsegments, combining the grey membership parameter for each of the plurality of image pixels from each of the plurality of image segments and subsegments to estimate a net grey membership parameter for each image pixel and assigning color (black or white) to each of the plurality of image pixels based on the estimated net grey membership parameter of the respective pixel.

In accordance with another aspect, a method of binarizing an image is provided. The method includes partitioning the image into a plurality of image segments, each image segment having a plurality of image pixels and partitioning each of the image segments into subsegments, each subsegment having a plurality of image pixels. The method also includes enhancing a contrast level of each of the plurality of image segments and subsegments to estimate a contrast-stretched grey value for each image pixel of each of the plurality of image segments and subsegments and estimating a grey membership parameter for each image pixel for each of the plurality of image segments and subsegments based upon the contrast-stretched grey value of the image pixel. The method also includes determining a weighted average of grey membership parameters for each of the plurality of image pixels from each of the plurality of image segments and subsegments to estimate a net grey membership parameter for each image pixel, wherein the weighted average is a linear function of a number of the image segments or subsegments within each image segment and assigning color (black or white) to each of the plurality of image pixels based on the estimated net grey membership parameter of the respective pixel.

In accordance with another aspect, an image binarization system is provided. The image binarization system includes a memory circuit configured to store an input image and an image processing circuit configured to partition the input image into a plurality of image segments and subsegments, each image segment and subsegment having a plurality of image pixels. The image processing circuit is configured to estimate a net grey membership parameter for each image pixel of each of the plurality of image segments and subsegments by combining individual grey membership parameters of each image pixel from each of the plurality of image segments and subsegments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 illustrates example original, groundtruth and binarized images with binarization results for the binarized images.

DETAILED DESCRIPTION

Figure 1:
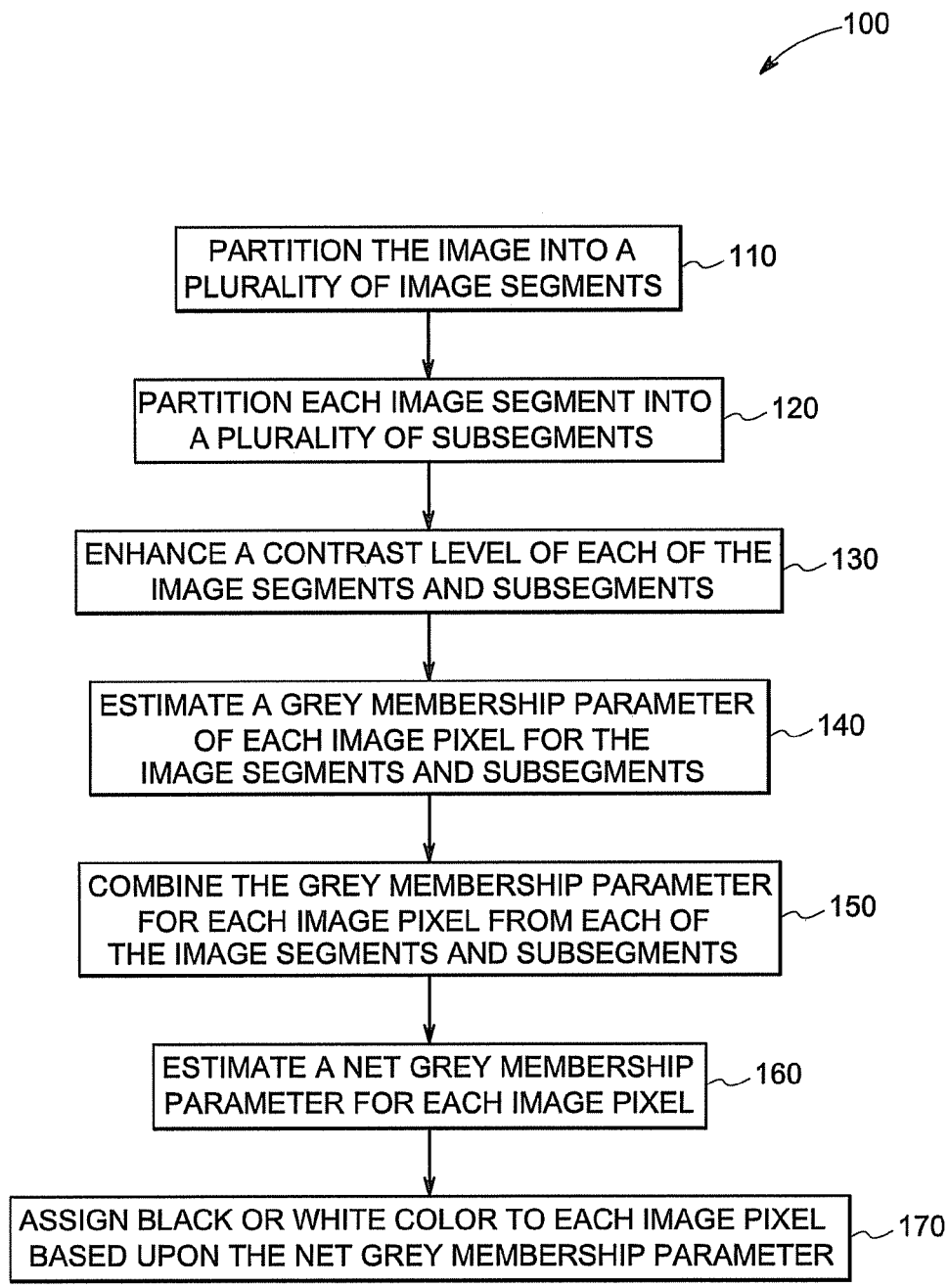
FIG. 1 is an example flow diagram of an embodiment of a method of binarizing an image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to image binarization. Such techniques may be useful in binarizing images such as document images and camera captured images to generate black and white images that facilitate object recognition and classification required in a variety of applications. In certain embodiments, such techniques may be employed to assign different colors to portions of images based upon pre-determined thresholds for color assignments in applications such as medical image processing.

Referring now to FIG. 1, an example flow diagram 100 of an embodiment of a method of binarizing an image is illustrated. As used herein, the term "image binarization" refers to method of converting a grey scale image or a multi-tone image into a black and white image or a two-tone image. At block 110, the image is partitioned into a plurality of image segments. Each image segment includes a plurality of image pixels. For example, four equal image segments may be generated by partitioning the image horizontally and vertically to provide first level of partitioning.

At block 120, each of the image segments is partitioned into subsegments, each subsegment having a plurality of image pixels. For example, each of the four image segments may further be divided into four equal subsegments to provide a second level of partitioning. In certain embodiments, each of the subsegments may be further partitioned to provide subsequent levels of partitioning. In one example embodiment, the image may be divided to provide four levels of partitioning. In certain embodiments, only certain portions of the image that require binarization are partitioned into image segments and subsegments. Such portions may be automatically detected based upon grey values of pixels of the image or may be pre-defined.

At block 130, a contrast level of each of the plurality of image segments and subsegments is enhanced to estimate a contrast-stretched grey value for each image pixel of each of the plurality of image segments and subsegments. In this example embodiment, the contrast level is enhanced using a histogram equalization technique. The histogram equalization technique employs 256 grey levels for stretching the contrast level, where maximum grey value of an image pixel is 255. In this embodiment, a probability of occurrence of grey level k is represented by the following equation:

$$P_k = \frac{n_k}{N} \quad (1)$$

Where: $n_k$ is number of pixels having grey level k; and N is the total number of pixels in the image.

At block 140, a grey membership parameter for each image pixel for each of the plurality of image segments and subsegments is estimated. In certain embodiments, grey values for each of the plurality of image pixels of the image are estimated. Further, mean and standard deviation of the grey values of image pixels are estimated for each image segment and subsegment. The estimated standard deviation is compared with a pre-determined threshold. In one embodiment, a first grey membership parameter is assigned to image pixels of the image segments having the standard deviation below the pre-determined threshold. In an alternate embodiment, a second grey membership parameter is assigned to image pixels of the image segments having the standard deviation above the pre-determined threshold.

In this embodiment, the first grey membership parameter is estimated by dividing the mean of grey values with a pre-determined maximum grey value of the image pixel. In one example embodiment, the pre-determined maximum grey value is 255. Further, the second grey membership parameter is estimated by dividing the contrast-stretched grey value with the pre-determined maximum grey value of the image pixel. The contrast-stretched grey value $S_k$ is estimated using the cumulative occurrence of the grey level k in the original image in accordance with the following relationship:

$$S_k = \sum_{j=0}^{k} \frac{n_j}{N} \times 255 \quad (2)$$

Where: 255 is the maximum grey value of the image pixel.

As described above, the contrast-stretched grey value $S_k$ divided by the maximum grey value results in the second grey membership parameter.

At block 150, grey membership parameters for each image pixel are combined from each of the plurality of image segments and subsegments to estimate a net grey membership parameter for each image pixel (block 160). In this exemplary embodiment, a weighted average of the grey membership parameters for each of the plurality of image pixels from each of the plurality of image segments and subsegments is determined to estimate the net grey membership parameter for each image pixel. In one example embodiment, the weighted average is a linear function of a number of the image segments or subsegments within each image segment. In another embodiment, the weighted average is a function of square of the number of the image segments or subsegments within each image segment.

In this exemplary embodiment, the net grey membership parameter is estimated in accordance with the following relationship:

$$\text{net\_membership}[y][x] = \frac{\sum_{k=startlevel}^{endlevel} \text{membership}[y][x][k] \times (k+1)}{\sum_{k=startlevel}^{endlevel} (k+1)} \quad (3)$$

Where: k is the number partitioning levels; and
membership[y][x][k] is the grey membership parameter for a pixel p(x, y).

Thus, a net grey membership parameter is estimated for each image pixel by combining the grey membership parameters from the image segments and subsegments from different levels of partitioning thereby retaining the global as well as local information of the variation of the grey level.

At block 170, black or white color is assigned to each of the plurality of image pixels based on the estimated net grey membership parameter of the respective pixel. In this example embodiment, the estimated net grey membership parameter of each image pixel is compared with a pre-determined threshold and black color is assigned to pixels having net grey membership parameter below the threshold. Alternatively, white color is assigned to image pixels having net grey membership parameter above the threshold. In this example embodiment, the mean grey level is positioned in the middle position of a grey scale histogram equalized image and thus the pre-determined threshold is 0.5.

In certain embodiments, the technique described above may be employed to assign different colors to portions of images based upon pre-determined thresholds. The original image may be partitioned into image segments and subsegments as described above. Further, a color membership parameter for each image pixel for each of the plurality of image segments and subsegments is estimated. Again, color membership parameters for each image pixel are combined from each of the plurality of image segments and subsegments to estimate a net color membership parameter for each image pixel. Moreover, different colors may be assigned to each of the plurality of image pixels based on the estimated color membership parameter of the respective pixel and pre-determined thresholds for each of the different colors.

In certain embodiments, the technique described above may be employed to color images when an RGB image is mapped into luminance/chrominance space. In particular, the technique may be implemented for the luminance/brightness (Y) plane in YUV or YCbCr color space or the luminance plane (L) in L*uv color space or Luminance/Intensity plane (I) in HSI space etc.

Figure 2:
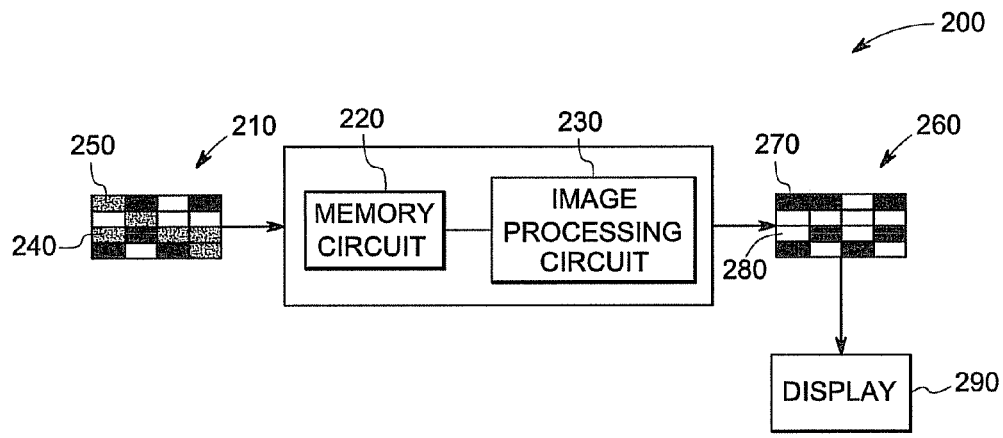
FIG. 2 is an example image binarization system.

FIG. 2 illustrates an example image binarization system 200. The image binarization system 200 includes a memory circuit 220 configured to store an input image 210. Further, the image binarization system 200 includes an image processing circuit 230 configured to convert a grey image to a black and white image as described below. In one embodiment, the input image 210 includes a document image such as obtained from an optical scanning device. In another embodiment, the input image 210 includes a camera captured image. However, a variety of other images may be binarized using the image binarization system 200. As illustrated, the input image 210 includes a plurality of image pixels such as represented by reference numerals 240 and 250 having different grey levels.

The memory circuit 220 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

In certain embodiments, the input image 210 includes a color image and the image processing circuit 230 is configured to separate the red (R), green (G) and blue (B) components from the 24-bit color value of each pixel and the 8-bit grey value of each image pixel is estimated in accordance with the following relationship:

$$\text{grey}(i,j)=0.59*R(i,j)+0.30*G(i,j)+0.11*B(i,j) \quad (4)$$

Where: (i,j) indicates a location of a pixel in the image.

Furthermore, a median filter may be employed to replace the grey value of a pixel by the median of grey values of its neighbors. In certain embodiments, a median filter having 3×3 mask is applied over the grey scale image to obtain eight neighbors of a pixel and their corresponding grey values. The use of the median filter facilitates reduction of noise in the image 210.

In the illustrated embodiment, the image processing circuit 230 is configured to partition the input image 210 into a plurality of image segments and subsegments. Each image segment and subsegment includes a plurality of image pixels. The image processing circuit 230 is further configured to estimate a net grey membership parameter for each image pixel of each of the plurality of image segments and subsegments by combining grey membership parameters of each image pixel from each of the plurality of image segments and subsegments.

The image processing circuit 230 is configured to enhance a contrast level of each of the plurality of image segments and subsegments using histogram equalization and to estimate the grey membership parameter for each of the plurality of image pixels based upon a contrast-stretched grey value of the image pixels. Further, the image processing circuit 230 is configured to generate a binary output image 260 by assigning black or white color to each image pixel such as represented by reference numerals 270 and 280.

In this example embodiment, the image pixels having the net grey membership parameter below a pre-determined threshold are converted to black pixels while the image pixels having the net grey membership parameter above the pre-determined threshold are converted to white color. As an example, the input pixel 250 is converted to black as output pixel 270, while the input pixel 240 is converted to white as output pixel 280. The binarized output image 260 is sent to an output of the system 200. In this example embodiment, the output image 260 is displayed to a user of the system 200 via a display 290. In certain embodiments, the binarized output image 260 is processed to remove noise components using morphological open-close technique.

Figure 3:
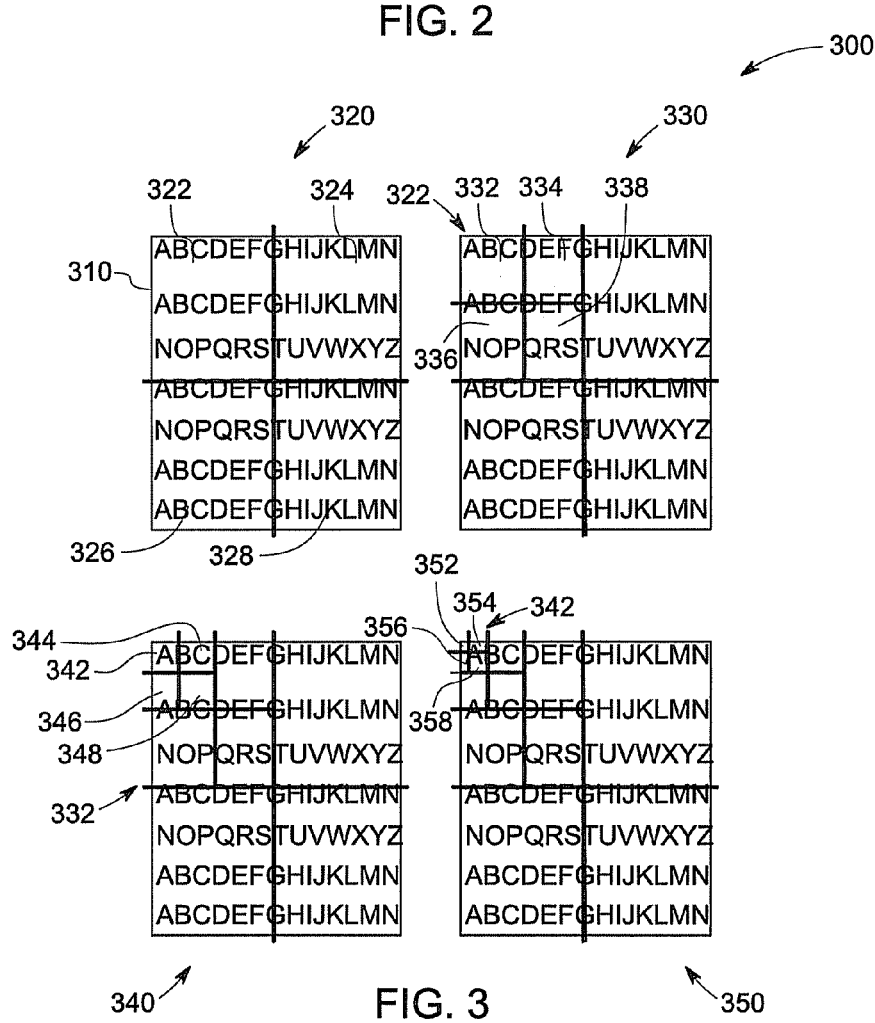
FIG. 3 illustrates images with different levels of partitioning for image binarization using the system of FIG. 2.

FIG. 3 illustrates images 300 with different levels of partitioning for image binarization using the system 200 of FIG. 2. As described before, the image 310 is partitioned into a plurality of image segments and subsegments, each image segment and subsegment having a plurality of image pixels. In an example configuration 320, the image 310 is partitioned along both height and width dimensions to generate four equal-sized image segments represented by reference numerals 322, 324, 326 and 328. This provides the first level of partitioning for the image 310 and a first level grey membership parameter for each pixel of the image 310 is estimated using the contrast-stretched grey value of each pixel.

Each of the image segments 322, 324, 326 and 328 is further partitioned into four equal subsegments in a second level of partitioning. For example, as illustrated in exemplary configuration 330, the image segment 322 is partitioned into four equal subsegments such as represented by reference numerals 332, 334, 336 and 338. Further, each of these subsegments 332, 334, 336 and 338 may be further partitioned in third and fourth levels of partitioning such as represented in example configurations 340 and 350.

Thus, segment 332 is partitioned into four equal subsegments 342, 344, 346 and 348 in the third level of partitioning. Moreover, each of these subsegments 342, 344, 346 and 348 is further partitioned into subsegments such as represented by reference numerals 352, 354, 356 and 358 in the fourth level of partitioning. In the illustrated embodiment, four levels of partitioning are performed on the image 310. However, a greater or lesser number of partitioning levels may be employed. The number of levels may be determined based upon on the quality and the context of the input image 310 is configurable and may be specified by a user of the system 200. Further, the size of the image segments and subsegments also may be determined by the user based upon a desired binarization output.

Once the image segmentation is completed, histogram equalization technique is applied to each of the image segments and subsegments to enhance the contrast level of the image segments and subsegments. Further, the net grey membership parameter for each image pixel of each of the image segments is estimated by combining individual grey membership parameters for pixels from each image segment and subsegment of each partitioning level.

Figure 4:
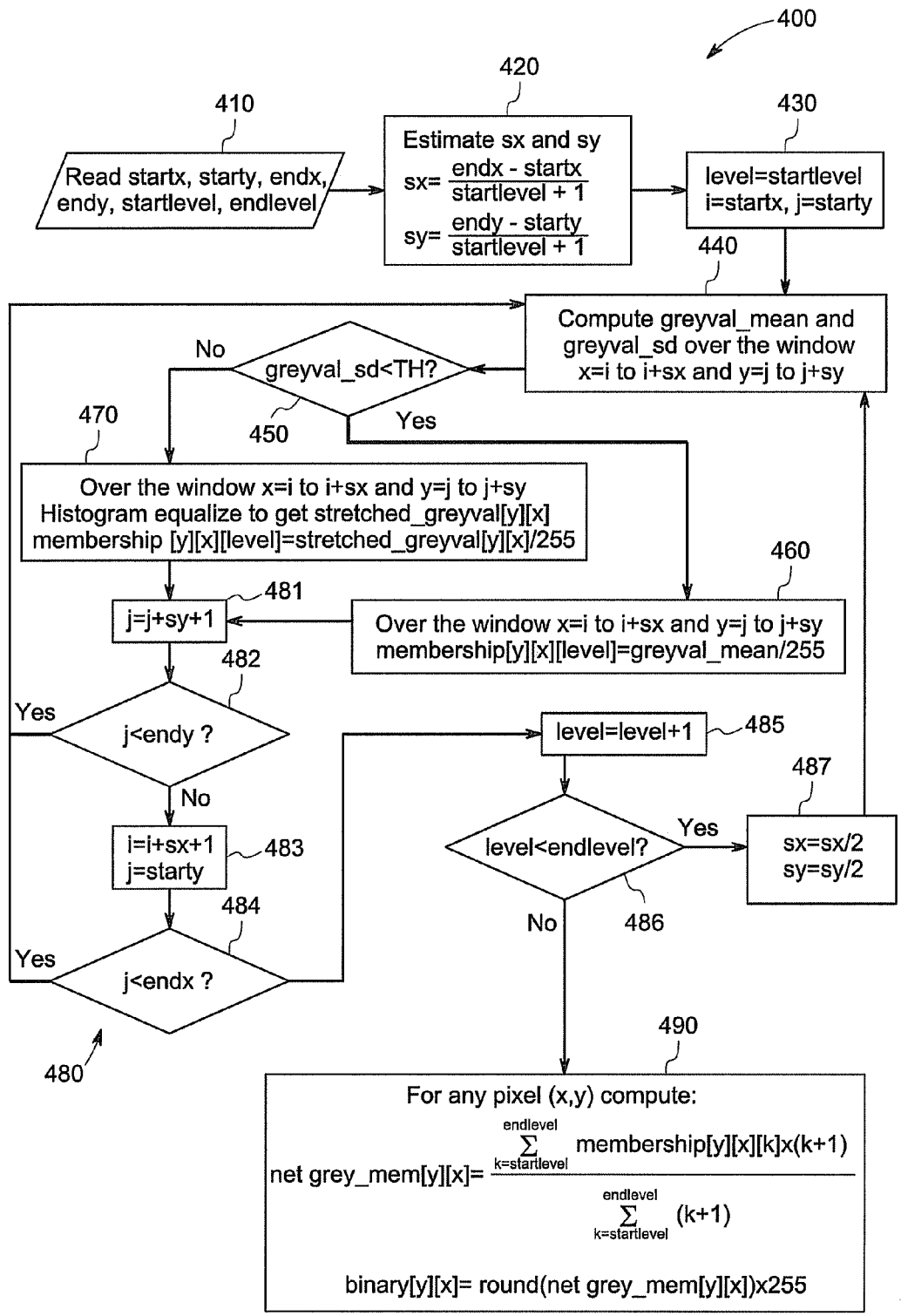
FIG. 4 is an example flow diagram of an embodiment of the image binarization method of FIG. 1.

FIG. 4 illustrates an example flow diagram 400 of an embodiment of the image binarization method of FIG. 1. At block 410, input values for a region of interest within the image are provided. In particular, input values of coordinates startx, starty, endx and endy of the region of interest are provided. For example, to binarize the full image, the values of coordinates startx and starty are set to zero and endx and endy are set to the width and height of the image respectively.

In this example embodiment, input values of starting level of partitions (startlevel) and a maximum number of partitions (endlevel) are also provided. For example, if full image is to be used for binarization, then the startlevel is set to zero. In another example, if the region of interest is to be divided into 9 image segments at the starting then the startlevel is set to 2 thereby resulting in 3 horizontal and 3 vertical partitions. Similarly, if the region of interest is to be divided into 36 image segments, then the endlevel is set to 5 thereby resulting in 6 horizontal and 6 vertical partitions.

At block 420, width (sx) and height (sy) of each image segment and subsegment is determined. The initial width (sx)

and height (sy) are estimated in accordance with the following equations:

$$sx = \frac{endx - startx}{startlevel + 1} \quad (5)$$

$$sy = \frac{endy - starty}{startlevel + 1} \quad (6)$$

At block 430, a variable "level" is set to startlevel to initiate the iteration for all levels of partitioning. Further, variables i and j are set to startx and starty respectively to select the first cell. The variables i and j are iteratively used to select different image segments and subsegments of the image. At block 440, all the pixels are accessed using position variables (x,y) and mean (greyval_mean) and standard deviation (greyval_sd) of grey values of pixels within each image segment are estimated. In this embodiment, the position variable x varies from value i to i+sx within an image segment and the position variable y varies from value j to j+sy.

At block 450, the estimated standard deviation (greyval_sd) for each image segment is compared with a pre-determined threshold (TH). If the standard deviation is below the pre-determined threshold, then the grey membership parameter (membership[y][x]) of all the pixels within the image segment is set to mean of grey values divided by 255 which is the maximum possible grey value of a pixel (block 460). If the standard deviation is above the pre-determined threshold, then the grey membership parameter of all the pixels within the image segment is set to contrast-stretched grey value of each pixel divided by 255 (block 470). The contrast-stretched grey value of each pixel is estimated using the histogram equalization technique described above with reference to FIG. 1.

The image is partitioned into image segments and subsegments and grey membership parameters for pixels for each image segments and subsegments of each partitioning level are estimated (block 480). The position variables x and y are incremented to access each image segment, as represented by blocks 481, 482, 483 and 484. Further, the number of levels is incremented until the endlevel specified by the user is reached (blocks 485 and 486). For each partitioning level, the image segment is divided into a plurality of subsegments. For example, each image segment may be divided into 4 subsegments by dividing the width (sx) and the height (sy) by 2 (block 487). It should be noted that each image segment may be partitioned into a greater or a lesser number of image subsegments.

Once the grey membership parameter is estimated for each image pixel of each image segment and subsegment, the net grey membership parameter (net grey_mem) is estimated using a weighted average of grey membership parameters (membership[y][x]) for each of the plurality of image pixels from each of the plurality of image segments and subsegments (block 490). In this example embodiment, the net grey membership parameter is a fraction value between 0 and 1. The binary value of any pixel is estimated by rounding the net grey membership parameter and multiplying the resulting value by 255. This binary value is subsequently used to assign black or white color to each pixel.

FIG. 5 illustrates example original, groundtruth and binarized images with binarization results for the binarized images. In this example embodiment, original images such as represented by reference numerals 510 and 520 are binarized using the binarization technique described above. The ground truth images corresponding to the original images 510 and 520 are represented by reference numerals 530 and 540 respectively. Further, the corresponding binarized images using the binarization technique described above are represented by reference numerals 550 and 560 respectively. In this example embodiment, the ground truth images 530 and 540 are reference images corresponding to the original images 510 and 520 respectively and having substantially accurate binary data. These reference images 530 and 540 are compared with the binarized images 550 and 560.

In this example embodiment, the image size of the original image 510 is about 2477×1078 pixels. The first level of partitioning includes four segments each of size of about 1238×539 pixels and the second level of partitioning includes 16 segments of size of about 619×270 pixels each. Further, the third level of partitioning includes 64 segments each of size of about 310×135 pixels and the fourth level of partitioning includes 256 segments each of size 155×68 pixels.

In this example embodiment, the image size of the original image 520 is about 201×824 pixels. The first level of partitioning includes four segments each of size of about 101×412 pixels and the second level of partitioning includes 16 segments of size of about 50×206 pixels each. Further, the third level of partitioning includes 64 segments each of size of about 25×103 pixels and the fourth level of partitioning includes 256 segments each of size 13×52 pixels.

The results of binarization for the images 550 and 560 are represented by reference numerals 570 and 580 respectively. The binarized images 550 and 560 are compared with the corresponding reference images 530 and 540 on a point-to-point basis and the results are classified into three categories. In one embodiment, the result is categorized as "true positive" if the corresponding pixels in both the reference and binarized images are black in color. In another embodiment, if an image pixel in binarized image is black and the corresponding image pixel in the reference image is white then the result is categorized as "false positive". In an alternate embodiment, if an image pixel in binarized image is white and the corresponding image pixel in the reference image is black then the result is categorized as "false negative".

In this example embodiment, the reference images 530 and 540 are compared with the corresponding binarized images 550 and 560 and number of pixels tp, fp and fn are determined for each of the true positive, false positive and false negative categories described above. Moreover, parameters such as "recall" (rc), "precision" (pr) and "f-measure" (fm) are estimated to quantitatively measure the binarization process.

In this example embodiment, the recall parameter is the fraction of black pixels in the output image that are black in color in the reference image. Further, the precision parameter is the fraction of black pixels in the output image that are black or white color in the reference image. Moreover, the f-measure parameter combines the recall and precision parameters and is indicative of the result of the binarization.

The recall, precision and f-measure parameters are estimated in accordance with the following equations:

$$rc = \frac{tp}{fn + tp} \quad (7)$$

$$pr = \frac{tp}{fp + tp} \quad (8)$$

$$fm = \frac{x \times rc \times pr}{rc + pr} \times 100\% \quad (9)$$

The number of pixels tp, fp and fn and the estimated recall, precision and f-measure parameters for the binarized images 550 and 560 are listed in results 570 and 580 respectively. As can be seen, the f-measure parameters for these images 550 and 560 are about 89.06% and 80.31% respectively indicating substantially accurate binarization of the images 510 and 530.

The example methods and systems described above enable binarization of a variety of images. The methods and systems discussed herein utilize an efficient, reliable, and cost-effective technique for performing binarization of images such as documents and camera captured images, having degradations such as due change in illumination, camera vibration, motion of objects during image capture and wind turbulence, among others. The technique described above facilitates image binarization using a combination of local and global thresholds to generate black and white binary images that facilitate object recognition and classification required in a variety of applications.

Figure 6:
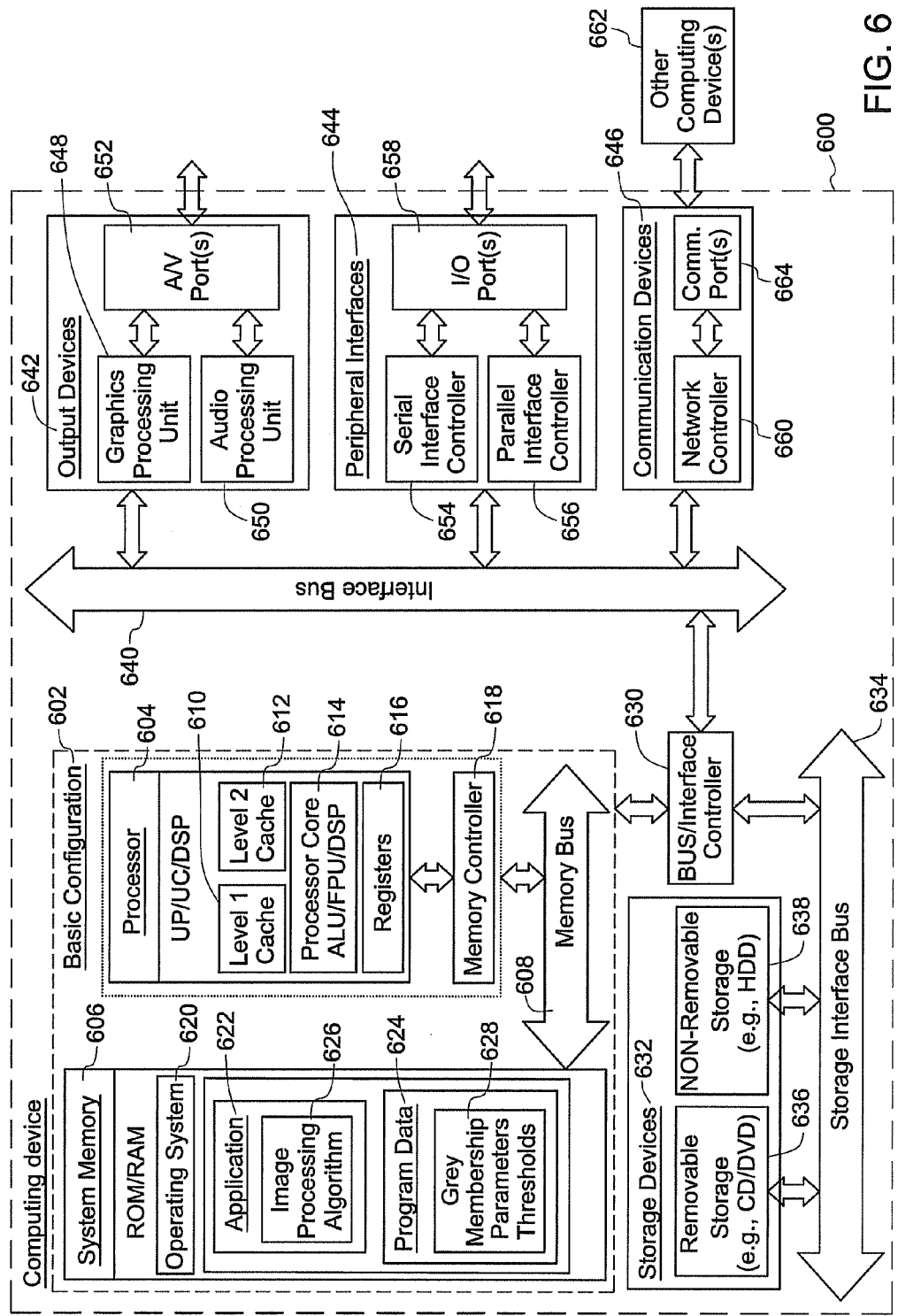
FIG. 6 is a block diagram illustrating an example computing device that is arranged for binarizing an image.

FIG. 6 is a block diagram illustrating an example computing device 600 that is arranged for binarizing an image in accordance with the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an image processing algorithm 626 that is arranged to perform the functions as described herein including those described with respect to process 100 of FIG. 1. Program data 624 may include grey membership parameter thresholds 628 that may be useful for binarizing the image as is described herein. In some embodiments, application 622 may be arranged to operate with program data 624 on operating system 620 such that image binarization based on estimated net grey membership parameters of image pixels may be performed. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal.

By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of binarizing an image, comprising:
   partitioning the image into a plurality of image segments, each image segment having a plurality of image pixels;
   partitioning each of the plurality of image segments into a plurality of subsegments, each image subsegment having a plurality of image pixels;
   estimating a grey membership parameter for each image pixel for each of the plurality of image segments and subsegments;
   combining the grey membership parameter for each of the plurality of image pixels from each of the plurality of image segments and subsegments to estimate a net grey membership parameter for each image pixel;
   assigning black or white to each of the plurality of image pixels based on the estimated net grey membership parameter of each respective one of the plurality of image pixels;
   enhancing a contrast level of each of the plurality of image segments and subsegments to estimate a contrast-stretched grey value for each image pixel of each of the plurality of image segments and sub segments;
   accessing a color image or a grey image of an object;
   estimating a grey value for each of the plurality of image pixels of the color image or grey image;
   estimating mean and standard deviation of grey values of image pixels of each of the plurality of image segments and subsegments;
   comparing the standard deviation with a pre-determined threshold; and
   assigning a first grey membership parameter to image pixels of the plurality of image segments having the standard deviation below the pre-determined threshold and assigning a second grey membership parameter to image pixels of the plurality of image segments having the standard deviation above the pre-determined threshold.

2. The method of claim 1, wherein the first grey membership parameter is estimated by dividing the mean of the grey values with a pre-determined maximum grey value of the image pixel.

3. The method of claim 1, wherein the second grey membership parameter is estimated by dividing the contrast-stretched grey value with a pre-determined maximum grey value of the image pixel.

4. The method of claim 1, wherein the enhancing the contrast level comprises stretching the contrast level of each of the plurality of image pixels using histogram equalization.

5. The method of claim 4, wherein a number of grey levels for stretching the contrast level comprises 256 and the maximum grey value of an image pixel is comprises 255.

6. The method of claim 1, wherein the combining the grey membership parameter comprises determining a weighted average of grey membership parameters for each of the plurality of image pixels from each of the plurality of image segments and subsegments to estimate the net grey membership parameter.

7. The method of claim 6, wherein the weighted average comprises a function of a number of the plurality of image segments or subsegments within each image segment.

8. The method of claim 6, wherein the weighted average is a function of a square of a number of the plurality of image segments or subsegments within each image segment.

9. The method of claim 1, wherein the assigning black or white color comprises: comparing the net grey membership parameter with the pre-determined threshold; and
assigning black color to the image pixels having the net grey membership parameter below the pre-determined threshold and assigning white color to the image pixels having the net grey membership parameter above the pre-determined threshold.

10. A method of binarizing an image, comprising:
partitioning the image into a plurality of image segments, each image segment having a plurality of image pixels;
partitioning each of the plurality of image segments into subsegments, each subsegment having a plurality of image pixels;
enhancing a contrast level of each of the plurality of image segments and subsegments to estimate a contrast-stretched grey value for each image pixel of each of the plurality of image segments and subsegments;
estimating a grey membership parameter for each image pixel for each of the plurality of image segments and subsegments based upon the contrast-stretched grey value of the image pixel;
determining a weighted average of grey membership parameters for each of the plurality of image pixels from each of the plurality of image segments and subsegments to estimate a net grey membership parameter for each image pixel, wherein the weighted average is a linear function of a number of the plurality of image segments or subsegments within each image segment; and
assigning black or white to each of the plurality of image pixels based on the estimated net grey membership parameter of each respective one of the plurality of image pixels, wherein k is a number of partitioning levels, the grey membership parameter for a pixel p(x,y) is membership [y][x][k], and the net grey membership parameter net membership[y][x] is estimated in accordance with a following relationship:

$$\text{net\_membership}[y][x] = \frac{\sum_{k=startlevel}^{endlevel} \text{membership}[y][x][k] \times (k+1)}{\sum_{k=startlevel}^{endlevel} (k+1)}.$$

11. The method of claim 10, comprising assigning black color to the image pixels having the net grey membership parameter below 0.5 and assigning white color to the image pixels having the net grey membership parameter above 0.5.

12. An image binarization system, comprising:
a memory circuit configured to store an input image; and
an image processing circuit configured to:
partition the input image into a plurality of image segments and subsegments, each image segment and subsegment having a plurality of image pixels,
estimate a net grey membership parameter for each image pixel of each of the plurality of image segments and subsegments by combining individual grey membership parameters of each image pixel from each of the plurality of image segments and subsegments,
enhance a contrast level of each of the plurality of image segments and subsegments using histogram equalization,
estimate the individual grey membership parameter of each image pixel based upon a contrast-stretched grey value for the image pixel,
access a color image or a grey image of an object,
estimate a grey value for each of the plurality of image pixels of the color image or grey image,
estimate mean and standard deviation of the grey values of image pixels of each of the plurality of image segments and subsegments,
compare the standard deviation with a pre-determined threshold, and
assign a first grey membership parameter to image pixels of the plurality of image segments having the standard deviation below the pre-determined threshold and assigning a second grey membership parameter to image pixels of the plurality of image segments having the standard deviation above the pre-determined threshold.

13. The image binarization system of claim 12, wherein the image processing circuit is further configured to determine a weighted average of grey membership parameters for each of the plurality of image pixels from each of the plurality of segments and subsegments to estimate the net grey membership parameter.

14. The image binarization system of claim 12, wherein the image processing circuit is further configured to generate a binary output image by assigning black or white color to each image pixel based upon the estimated net grey membership parameter of the respective pixel.

15. The image binarization system of claim 14, wherein the image processing circuit is further configured to substantially reduce noise in the binary output image using morphological open-close technique.

* * * * *

UNITED STATES PATENT AND TRADEMARK OFFICE
CERTIFICATE OF CORRECTION

PATENT NO. : 8,406,554 B1  
APPLICATION NO. : 12/629187  
DATED : March 26, 2013  
INVENTOR(S) : Saha et al.

Page 1 of 2

It is certified that error appears in the above-identified patent and that said Letters Patent is hereby corrected as shown below:

In the Drawings

In Fig. 6, Sheet 5 of 5, delete "UP/UC/DSP" and insert -- µP/µC/DSP --, therefor In the Specifications In Column 5, Line 18, delete "(RAID)," and insert -- (RAIDs), --, therefor.

In Column 8, Line 59, in Equation (9), delete "$fm = \dfrac{x \times rc \times pr}{rc + pr} \times 100\%$" and insert -- $fm = \dfrac{2 \times rc \times pr}{rc + pr} \times 100\%$ --, therefor.

In Column 9, Line 62, delete "(HDD)," and insert -- (HDDs), --, therefor.

In Column 9, Line 64, delete "(SSD)," and insert -- (SSDs), --, therefor.

In Column 10, Line 7, delete "(DVD)" and insert -- (DVDs) --, therefor.

In Column 10, Line 57, delete "configurations" and insert -- configurations. --, therefor.

In the Claims

In Column 13, Line 10, in Claim 5, delete "pixel is" and insert -- pixel --, therefor.

Signed and Sealed this  
Twenty-second Day of October, 2013

Teresa Stanek Rea  
*Deputy Director of the United States Patent and Trademark Office*

In Column 13, Line 59, in Claim 10, delete "net membership[y][x]" and insert -- net_membership[y][x] --, therefor.